March 8, 1960 R. A. WALLACE 2,927,670
FRACTIONAL REVOLUTION BI-DIRECTIONAL CLUTCH
Filed Sept. 23, 1955 3 Sheets-Sheet 1

INVENTOR.
RICHARD A. WALLACE
BY
ATTORNEY

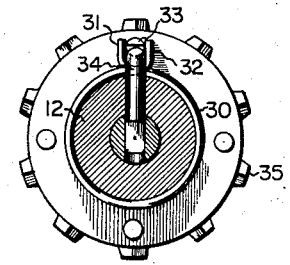
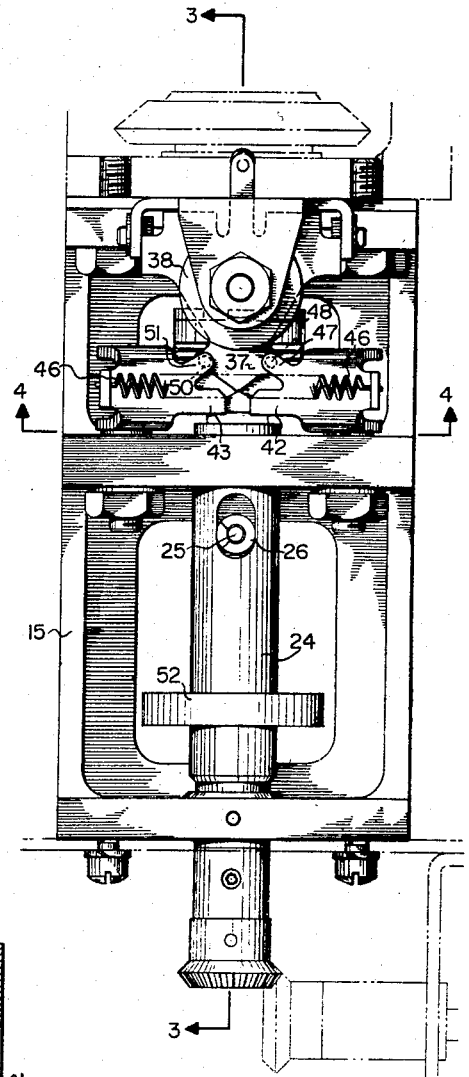
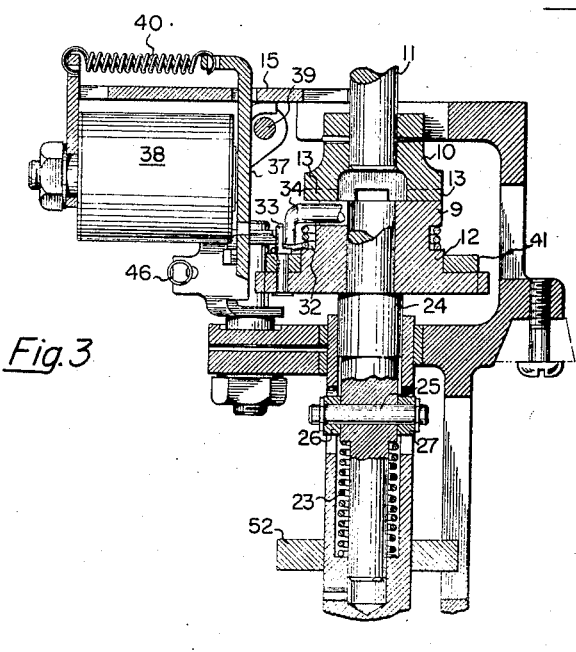

March 8, 1960 R. A. WALLACE 2,927,670
FRACTIONAL REVOLUTION BI-DIRECTIONAL CLUTCH
Filed Sept. 23, 1955 3 Sheets-Sheet 3
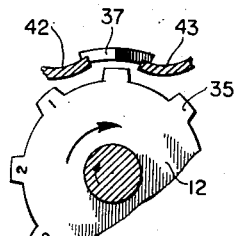
Fig.8
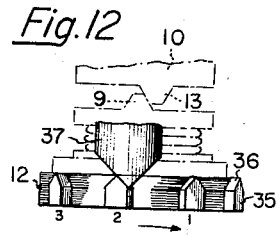
Fig.12
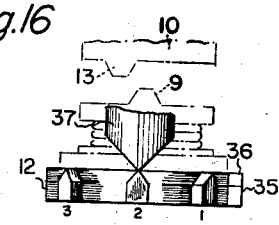
Fig.16
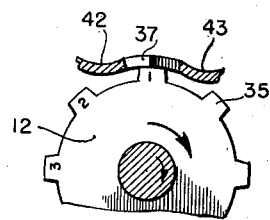
Fig.9
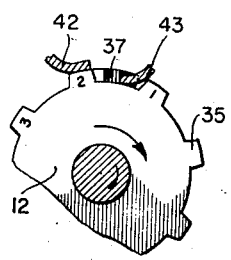
Fig.13
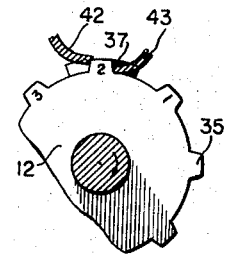
Fig.17
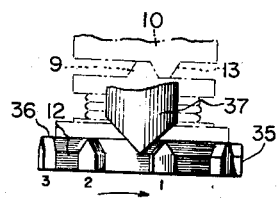
Fig.10
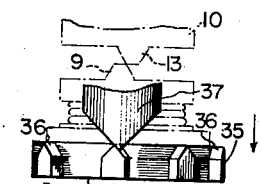
Fig.14
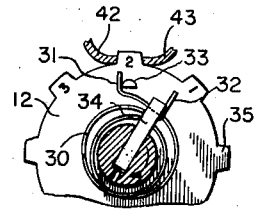
Fig.18
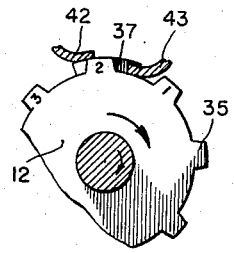
Fig.11
Fig.15
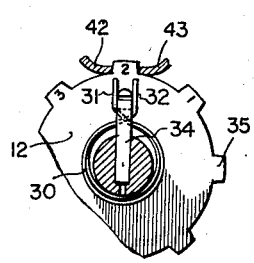
Fig.19
INVENTOR.
RICHARD A. WALLACE
BY
ATTORNEY

# United States Patent Office 2,927,670
Patented Mar. 8, 1960

2,927,670
FRACTIONAL REVOLUTION BI-DIRECTIONAL CLUTCH

Richard A. Wallace, Port Kennedy, Pa., assignor to Burroughs Corporation, Detroit, Mich., a corporation of Michigan Application September 23, 1955, Serial No. 536,121

14 Claims. (Cl. 192—12)

The present invention relates to clutches and more particularly to a fractional revolution, bi-directional clutch for high speed positive engagement and disengagement of driver and driven parts.

While the general application of the clutch of the invention is specifically for use as an adjunct for controlling record media fed into and out of an accounting machine, it can also be used with a variety of article handling mechanisms as well as a mechanical program control.

An object of the present invention is to provide an improved clutch for high speed engaging, disengaging, stopping and re-engaging in bi-directional use.

Another object of the invention is to provide an improved clutch mechanism operating from a bi-directional rotating power source and capable of stopping and starting at discrete points.

Another object is to provide an improved clutch operating mechanism for program use wherein the distance between clutch teeth represents the time between different portions of the program and wherein the clutch mechanism enables the program to proceed in either a forward or reverse direction.

A still further object is to provide a clutch control mechanism for high speed actuation wherein the clutch is arranged to engage, disengage, stop and re-engage a plurality of times during one revolution, either clockwise or counterclockwise, of the clutch driver.

Various other objects, advantages and meritorious features of the invention will become more fully apparent from the following specification, appended claims, and accompanying drawings wherein:

Fig. 2 is a side elevation of the same clutch control mechanism showing the parts in engaged position;

Fig. 3 is a fragmentary view in section on line 3—3 of Fig. 2, the view being similar to the full line portion of Fig. 1 but with the parts in engaged position;

Fig. 6 is a section view taken along line 6—6 of Fig. 1;

Fig. 7 is an enlarged fragmentary perspective view of a part of the driven wheel and one of the clapper engaging dogs thereof;

Figure 5:
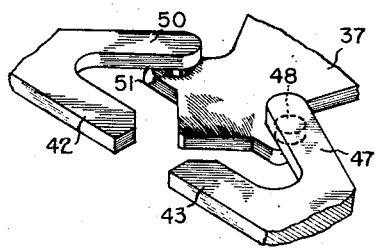
Fig. 5 is a fragmentary perspective view showing the clapper and associated detents.

Figs. 8 to 19 are diagrammatic views of the respective steps for one clutch control cycle: thus, Fig. 8 is a front elevation showing the associated clutch control parts in clutch engaged positions; Fig. 9 is a like view at the instant of clapper release; Fig. 10 is a plan view at the instant a clutch dog or tooth clears the clapper; Fig. 11 is a view in elevation of the parts for the position shown in Fig. 10; Fig. 12 is a view in plan at the instant a dog strikes the clapper; Fig. 13 is a view in elevation of the positions shown in Fig. 12; Fig. 14 is a view in plan at the instant the dog clutch disengages; Fig. 15 is a view in elevation of the positions shown in Fig. 14; Fig. 16 is a view in plan at the instant of lock-up showing a captured dog; Fig. 17 is a view in elevation of the positions shown in Fig. 16; Fig. 18 is an elevation view showing the shock absorber as functioning under the inertia of the parts; and Fig. 19 is a view like Fig. 18 showing the same parts as restored to zero position.

Referring to the drawings, the driving portion of the clutch of the invention comprises a driver wheel 10, keyed or otherwise made fast to a shaft 11 driven from a power source, and having a plurality of teeth on the face disposed for meshing engagement with the driven wheel 12 when the latter is shifted to clutch operating position. In the illustrated embodiment of the invention, the wheel 10 has two teeth 13 diametrically located and two teeth 14, also diametrically located, but preferably at ninety degrees to the teeth 13. For driving connection between the wheel 10 and wheel 12, the latter has two teeth 9 diametrically located for meshing with the driver wheel teeth. The drive shaft 11 is suitably journalled in a fixed frame 15 and, in this instance, has a shifter gear 16 keyed thereon but having an endwise sliding movement between two bevel gears 17 and 18, both of which are freely rotatable on shaft 11 and have clutch teeth 17' and 18' respectively on their inner faces. The ends of the shifter 16 carry teeth 19 and 20 for alternately meshing respectively with teeth 17' and 18'. The two bevel gears 17 and 18 are rotated in opposite directions from a unidirectional source of power represented by a continuously rotating bevel gear 21 common to the bevel gears 17 and 18 and engaging the same.

The driven wheel 12 is carried by a shouldered stub shaft 22 biased by a compression spring 23 toward the driving wheel 10. The stub shaft 22 is slidably received in the tubular end portion of the output shaft 24 and transmits rotation thereto by a pin 25 passing transversely thereof with projecting ends respectively mounting two guide rollers 26 and 27. The two rollers 26 and 27 are axially slidable respectively in axially elongated slots 28 and 29 of the tubular portion of theh shaft 24 for guiding of the axial movement of the shaft 22. The spring 23 is compressed between a shoulder of the shaft 22 and the reduced diameter of the tube portion of the shaft 24, the spring being encircled by the latter and biasing the wheel 12 toward clutching position. The output shaft 24 has end bearing supports in the fixed frame 15. Thus the clutch driven wheel 12, unless retracted, is held by the spring 23 in meshing relation with the driving gear 10.

It should be noted that the driven wheel 12 is freely rotatable on the stub shaft 22, but transmits its rotation to the stub shaft through the medium of a helical spring 30 coiled about the wheel 12. The spring has its opposite ends 31 and 32 free and projecting substantially radially away from the stub shaft in the manner shown in Fig. 6. The free ends of the spring are arranged to straddle two radially spaced pins 33 and 34. The pin 33 is fixed to the flange of the wheel 12 to project parallel to the shaft 22 and may be cut away on one side as shown to be close radially spaced relation to an offset of the pin 34. The latter pin is fixed to the shaft 22 and projects radially therefrom to bring its offset into juxtaposed parallel relation to the pin 33. Thus the two pins 33 and 34 operating through the medium of the spring 30 form a yielding connection for driving the shaft 22. Also the spring 30 functions when wheel 12 is unclutched to restore the driven parts to exact zero position, because pin 33 acts as a ground stop.

For the purpose of unclutching the wheel 12 and stopping the output shaft 24, attention is directed to Figs. 7-19 inclusive, wherein wheel 12 is best shown as having a circumferential flange formed with a series of circularly spaced apart radial projections or dogs 35. Each dog has a side extension 36 projecting from the inner face of the flange and parallel to the axis of rotation of the wheel and shaped into the formation of a pointed tooth or V. A detail of a dog 35 and its tooth is shown in Fig. 7. The dog has two oppositely disposed faces 35' and 35" which extend approximately radially outwardly from the periphery of the flange and cooperate with detents hereinafter described. The sloping sides 36' and 36" of the tooth cooperate with camming means operable to declutch the drive and driven members.

The sloping sides of the teeth 36 of the dogs are adapted to have a riding contact with one or the other of the beveled sides of the camming end of a camming member or clapper 37, according to the direction of rotation of the wheel 12. In the illustrated embodiment of the invention the clapper 37 constitutes the armature of a control magnet 38 and is pivoted at 39 to swing about an axis which brings its free end into the arcuate path of travel of the wheel dogs 35. The clapper 37 is provided with a pointed or V-shaped extremity, the inclined sides of which generally correspond to those of the teeth 36. A spring 40 is stretched between the clapper 37 and a fixed part of the frame and normally biases the clapper 37 into the path of travel of the dogs 35. A ring 41 is attached to the face of the flange of the wheel 12 to provide a stop for the clapper in its biased position. This ring 41 is of non-magnetic material to eliminate sticking of the clapper by residual magnetism. For better camming action, the dog engaging end of the clapper is given a transverse radius of curvature corresponding to that of the path of travel of the dogs.

Figure 4:
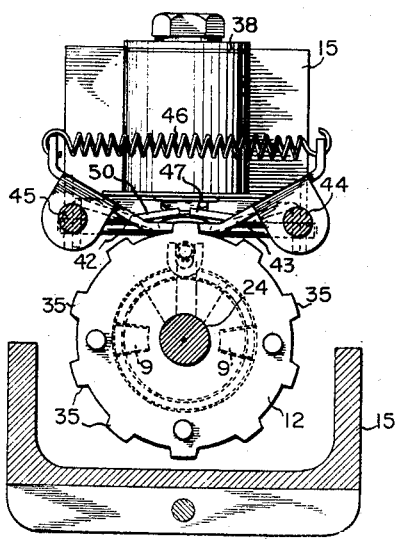
Fig. 4 is a sectional view on line 4—4 of Fig. 2.

A control magnet 38, of which the clapper 37 is the armature, is arranged to be energized by an electric signal or pulse from a suitable source, as will be later described. When the magnet 38 is de-energized the clapper 37 is urged by the spring 40 into the path of travel of the dogs 35 and thus have one of the dogs engage a sloping side of the clapper and cause the wheel to be cammed to its retracted or unclutched position. As shown in Fig. 4, there may be provided ten equally spaced dogs 35, which illustratively provide ten stops per revolution of the driving wheel 10. For the purpose of paper feed control these ten stops may provide ten lines for one revolution of the driven shaft, although it is to be understood that the number of stops per revolution may be varied.

As a means to stop the rotation of the multi-dog wheel 12 and lock the same in stopped position, two locking elements or detents 42 and 43 are provided and arranged in juxtaposed relation to the swinging movement of the clapper and adjacent to the dog carrying peripheral portion of the wheel 12. Thus the detent 42 is carried by a pivot 44 forming an axis parallel to the shaft 22, and the detent 43 is carried by a pivot 45 forming an axis parallel to the shaft 22 but on the opposite side of the clapper 37 from the pivot 44. A tension spring 46 is stretched between the outer extremities of the detents to bias their stop ends towards the wheel 12 where the spacing between these stop ends is such as to receive a dog 35 therebetween.

The two stop and locking detents 42 and 43 are arranged to be controlled by the shifting of the clapper 37. For this purpose the detent 42 has a laterally disposed arm 50 seating on top of the V-cam of the clapper through the medium of a spacing button 48 formed of non-magnetic material. The arm 50 is offset upwardly from the plane of the detent 42 to properly seat upon the clapper in the latter's inclined position. Also the detent 43 has a similarly laterally disposed arm 47 seating on the top of the V-cam of the clapper 37 through the medium of a spacing button 51 of non-magnetic material. The arm 47 is offset upwardly from the plane of the detent 43 to properly seat upon the clapper in the latter's inclined position. Thus the two buttons 48 and 51 prevent lag or sticking of the clapper 37 due to residual magnetism.

In describing the operation of the clutch control it will be assumed the clutch is engaged with wheel 12 rotating in a clockwise direction from which the declutching cycle will be described by means of the schematic Figs. 8 to 19.

Figure 1:
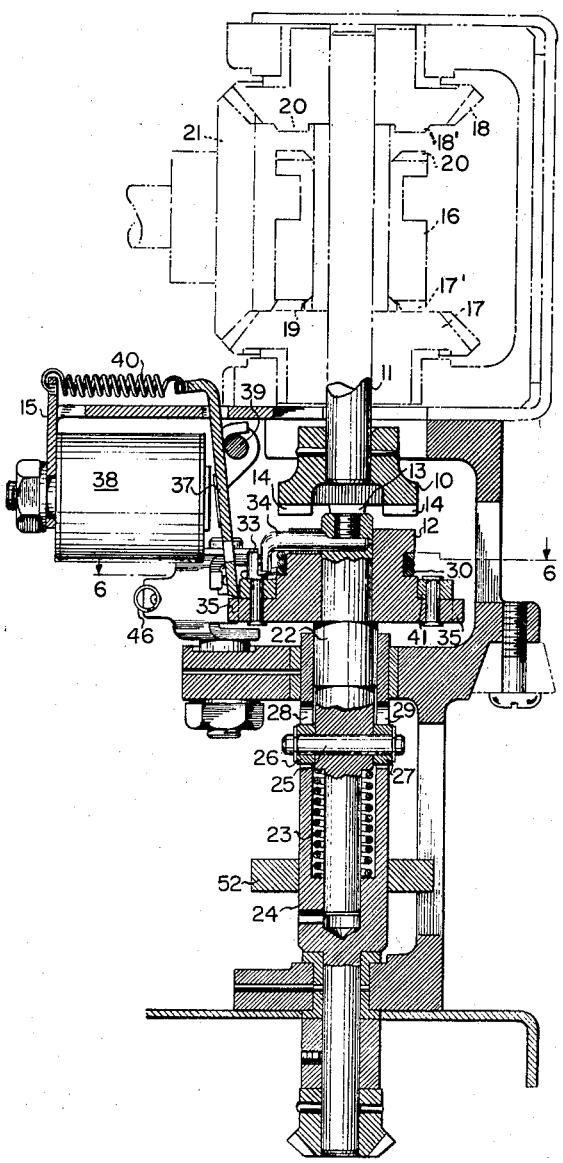
Fig. 1 is a medial sectional view of a clutch control mechanism embodying one form of the present invention, the parts being shown in declutched positions.

With the magnet energized, wheel 12 is turning as indicated in elevation Fig. 8, and clapper 37, and detents 42 and 43 are spaced away from the path of the wheel dogs. The magnet is de-energized at the instant dog 1 is beneath clapper 37, as shown in Fig. 9, and clapper 37 drops to sit on dog 1 while holding the detents still raised. The instant dog 1 clears clapper 37 the clapper drops between dog 1 and dog 2, and in this position detent 43 rests on dog 1 and detent 42 rests in the area between dog 1 and dog 2, as shown in Fig. 11. Fig. 10 shows in plan view the position of clapper 31 for Fig. 11. When wheel 12 rotates further, detent 43 drops between the dogs 1 and 2, as shown in Fig. 13, but detent 42 rests upon dog 2 while clapper 37 is still between dogs 2 and 1. As wheel 12 continues to rotate, dog 2 meets the cam face of clapper 37, as shown in plan by Fig. 12. The resulting camming action causes wheel 12 to slide axially in the direction of the vertical arrow adjacent Fig. 14, compressing spring 23 and causing disengagement of wheel 12 from driver wheel 10. Fig. 14 shows the clutch at the instant teeth 9 and 13 disengage. At this time wheel 12 has slid approximately three-quarters of its travel. From this point only the inertia of the driven parts provide the force to continue the camming action since no more torque can be exerted upon wheel 12 by driver wheel 10. It is preferable to equip the output shaft with a fly wheel 52, as shown in Figs. 1, 2 and 3, to provide the driven parts with enough inertia to insure ample force for continuing the camming action. At this instant of clutch disengagement, as shown in Fig. 15, detent 43 continues to remain between dogs 1 and 2, and detent 42 still bears on dog 2 but is ready to drop between dogs 2 and 3. The inertia of the flywheel and driven parts continue the camming action until, as shown in Fig. 16, the tip of clapper 37 is resting against the tip of dog 2, and there is axial clearance between teeth 9 and 13. At this instant, as shown in Fig. 17, the side face of dog 2 has abutted detent 43, stopping wheel 12 abruptly. Detent 42 then drops between dogs 2 and 3, locking wheel 12 against reverse rotation. Thus dog 2 is fully captured. Forward rotation is prevented by detent 43, rearward rotation by detent 42, and reengagement with driver wheel 10 by the tip of clapper 37.

When wheel 12 stops suddenly against detent 43, the inertia of the driven parts will cause torsion spring 30, shown in Fig. 18, to wind and act as a shock absorber. When the kinetic energy of the flywheel and the driven parts has been absorbed, spring 30 will return the driven parts to a zero position by pushing against pin 34 until it returns under pin 33, as shown in Fig. 10. In Figs. 18 and 19 the coiled spring 30 is shown on the opposite side of the flange of the driven wheel 12 instead of in the actual construction embodied in Figs. 1 to 6 for the purpose of clarity.

It is evident that when magnet 38 is energized the clapper and associated detents will move to the cleared positions shown in Fig. 8 and wheel 12 will again be urged by spring 23 into engagement with driver wheel 10. It is further evident that the aforementioned action will be the same irrespective of whether wheel 12 is rotating in the clockwise direction shown in Figs. 8-19 or in a counterclockwise direction, the only difference being that the roles of detents 42 and 43 are interchanged, and the opposite inclined faces of the dogs 35 and clapper 37 are engaged.

It will now be apparent that a positive engaging bi-directional clutch control mechanism of low mass construction has been devised which is capable of operating reliably when the time between teeth is of the order of 10 to 15 milliseconds. The clutch therefore can be made with any number of dogs at constant or variable spacing, the limiting factor being the time between teeth.

What is claimed is:

1. A positive engaging clutch control mechanism comprising a driving clutch member, a driven clutch member, means biasing said driven member to engage said driving member, a plurality of dogs arranged circumferentially in spaced relation on said driven member, each dog having a beveled face, a pivoted clapper arranged to move into and out of the path of movement of said dogs, said clapper having a cam end positioned to be engaged by the beveled face of any one of said dogs and operable when so engaged to shift said driven member against said biasing means and away from the driving member to thereby disengage said driven member, a magnet for holding said clapper away from said dogs when energized, spring means for moving said clapper to dog engaging position when said magnet is de-energized, means associated with said clapper and effective after the clapper is moved into dog engaging position by the spring means to stop rotation of said driven member, a driven shaft, and means between said driven member and said shaft to drive said shaft when said driven member is engaged with the driving member.

2. A clutch control mechanism according to claim 1, wherein said shaft driving means includes a bi-directional spring.

3. A clutch control mechanism according to claim 1, wherein said stop means is a detent pivoted to move into the path of a dog, a spring biasing said detent towards said path, and an arm on said detent seating on said clapper whereby after said clapper moves into the path of movement of a dog said detent drops in front of a dog.

4. A clutch control mechanism according to claim 3 wherein said arm has a button of non-magnetic material as a support for the detent on the clapper.

5. A clutch control mechanism according to claim 1 wherein said stop means is a pair of oppositely disposed detents respectively pivoted to move into straddling relation to a dog, a spring biasing said detents towards said dogs, and an arm on each detent to seat on said clapper to follow the clapper movement for engaging and disengaging a stop.

6. A clutch control mechanism according to claim 5 wherein each stop arm has a button of non-magnetic material as a support for the respective detents on the clapper.

7. A positive engaging clutch control mechanism comprising a driving clutch member, a driven clutch member, means biasing said driven member to engage said driving member, peripheral spaced dogs on said driven member, a laterally disposed V-shaped projection on each dog, a pivoted clapper arranged to move into and out of the path of movement of said dogs, said clapper having a V-shaped cam end to be engaged by a dog projection for shifting of said driven member against said biasing means to disengage said driven member from said driving member whether turning in one direction or the other, a magnet for holding said clapper away from said dogs when the magnet is energized, spring means for moving said clapper to dog engaging position when said magnet is de-energized, a driven shaft, and means between said member and said shaft to drive said shaft when said driving and driven members are engaged.

8. A clutch control mechanism according to claim 7 further including means operable to stop said driven member from turning when disengaged.

9. A clutch control mechanism according to claim 7, wherein a support of non-magnetic material seats said clapper when in dog engaging position.

10. A clutch control mechanism according to claim 9 wherein said support is a ring carried by the driven member.

11. A positive engagement type clutch and electromagnetic control mechanism comprising a driving clutch member which may be rotated in one direction or the other, a driven clutch member, means biasing said driven member to engage said driving member, peripherally spaced dogs on said driven member, a laterally disposed V-shaped projection on each dog, a pivoted clapper having a V-shaped cam and disposed adjacent to the path of travel of the dog projections and operable when engaging any one of said dogs to cause disengagement of the said driving and driven members, said clapper being magnetically insulated from said driven member, an electromagnet adjacent to the clapper and operable to hold said clapper away from said dogs when the magnet is energized, spring means for moving said clapper to dog engaging position when said magnet is de-energized, a pair of detents biased to move towards the path of travel of said dogs and responsive to the declutching movement of the driven clutch member to engage any one of said dogs and lock the driven clutch member from rotation in either direction, said detents being insulated magnetically from said clapper, a driven shaft and shock absorbing means between said driven member and said shaft for driving the latter.

12. A clutch mechanism comprising a driving clutch member and a driven clutch member, means biasing said driven member into engagement with said driving member, peripherally spaced dogs on said driven member, means intermittently operable to oppose said biasing means to disengage said driven member from said driving member, said opposing means including a cam positionable to coact with said dogs, a pair of detents operatively associated with said cam and movable substantially concurrently therewith to engage opposite sides of a selected one of said dogs to stop said driven member when disengaged from said driving member, a driven shaft, and means between said driven member and said shaft to drive said shaft when said member is engaged.

13. A fractional revolution clutch mechanism comprising a driving clutch member, a driven clutch member, means biasing said driven member into operative engagement with said driving member, a plurality of peripherally spaced dogs on said driven member, electromagnetic means intermittently operable to disengage said driven member from said driving member, said last means including a clapper having a cam positionable to coact with said dogs, a detent operable to engage the leading edge of any one of said dogs to stop said driven member when the latter is disengaged from the driving member, said clutch having opposing faces constructed so as to cause engagement of the driving and driven members upon release of said detent from said dogs at a plurality of positions, a driven shaft, and means between said driven member and said shaft to drive said shaft when any one of said dogs is released.

14. In combination, a fractional revolution clutch mechanism comprising, clutch means including a driving clutch member and a driven clutch member, means biasing said driven member into engagement with said driving member, a plurality of peripherally spaced projections on said driven member, the number of projections being equal to the number of fractional revolution rest positions to be assumed by the driven clutch member, means intermittently operable to oppose said biasing means preventing engagement of the driving member with the driven member, said opposing means including a cam positionable to coact with said projections, means engaging said projections to stop said driven member when disengaged, said clutch members having opposing faces constructed so as to permit engagement of the driving member with the driven member at a plurality of positions upon release of any one of said projections, and means for rotating said driving member.

References Cited in the file of this patent

UNITED STATES PATENTS

| 469,206 | Geb | Feb. 16, 1892 |
| 919,006 | Hancock | Apr. 20, 1909 |
| 1,555,724 | Tuppen | Sept. 29, 1925 |
| 1,599,046 | Good | Sept. 7, 1926 |
| 2,060,175 | Carleton | Nov. 10, 1936 |
| 2,265,134 | Gollwitzer | Dec. 9, 1941 |
| 2,658,599 | Luhn | Nov. 10, 1953 |
| 2,742,125 | Borchardt | Apr. 17, 1956 |
| 2,777,552 | Flavin | Jan. 15, 1957 |